May 31, 1966 J. K. BERGER 3,254,330

ELECTRONIC DIGITAL COMPUTER-OUTPUT CONTROL

Filed June 15, 1962 2 Sheets-Sheet 1

INVENTOR.
JAMES K. BERGER
BY [signature]
ATTORNEY

May 31, 1966 J. K. BERGER 3,254,330

ELECTRONIC DIGITAL COMPUTER-OUTPUT CONTROL

Filed June 15, 1962 2 Sheets-Sheet 2

United States Patent Office 3,254,330

Patented May 31, 1966

3,254,330
ELECTRONIC DIGITAL COMPUTER-OUTPUT CONTROL

James K. Berger, Beverly Hills, Calif., assignor to General Precision, Inc., a corporation of Delaware
Filed June 15, 1962, Ser. No. 202,797
4 Claims. (Cl. 340—172.5)

The present invention relates to electronic binary digital computers, and it relates more particularly to improved input-output storage and control circuits for use in such computers to control the feed of information between the computer and associated input-output devices.

It is usual to introduce the digital output information from the present-day binary digital computer to one or more appropriate output devices which serve to translate the output information into readable form and to provide a record of the translated output information.

The output devices may, for example, be of the mechanical type which responds to the binary digital output signals from the computer to provide a typed or printed record corresponding to the information represented by such output signals.

The Friden Flexowriter is typical of such an output device. The Friden instrument, for example, includes an internal mechanical binary-to-decimal translator, and it responds to multi-digit binary output signals from the computer to convert the same to decimal or alpha characters, and to provide a corresponding typed or printed record.

The Friden Flexowriter includes an internal magnetically controlled clutch which must be actuated when each multi-digit binary word is introduced to the instrument, so as to initiate the corresponding translating and typing cycle of the machine. The Friden Flexowriter also includes magnetically actuated drivers which are individually actuated in accordance with the different digits of each multi-digit binary word fed to the machine by the computer, and simultaneously with the energization of the clutch.

The International Business Machines typewriter is another type of output device. This latter device is similar to the Friden Flexowriter, except that it does not include an internal binary-to-decimal translator. Therefore, each multi-bit binary word from the computer must first be fed to a separate electrical binary-to-decimal translator network in which the multi-digit binary signals representing the word are converted to corresponding decimal-coded or alpha character actuating signals for the I.B.M. typewriter.

The output devices described briefly above are incapable of operating at speeds comparable with the speed at which the computer produces its output information. Therefore, unless some buffering system is provided, the computer must stop and wait for a particular piece of output information to be fed to and accepted by the selected output device. That is, the above-mentioned output devices are incapable of responding to the brief output pulses which are generated by the computer to represent its output information, while the computer was operating at normal speeds.

However, such stopping of the computer represents an inefficient waste of time, and most present-day computers are provided with some sort of output buffer to obviate such a waste. The usual output buffer can be loaded rapidly by the computer, and it can then be controlled to feed the information more slowly to the selected output device, while the computer carries on with its program. However, such buffers are relatively complex and expensive.

An important object of the present invention is to provide an improved output system for the output information of a computer, which output system is capable of responding rapidly to a piece of multi-digit binary information from the computer, and which is constructed to transform the information into voltage levels which can be utilized by the output device.

A feature of the invention is the provision of such an improved output system which requires relatively few extra components in order to convert the usual output circuitry so as to impart pulse-to-voltage level capabilities thereto.

Other objects, features and advantages of the invention will become apparent from a consideration of the following specification, when the specification is taken in conjunction with the accompanying drawings, in which.

Figure 1:
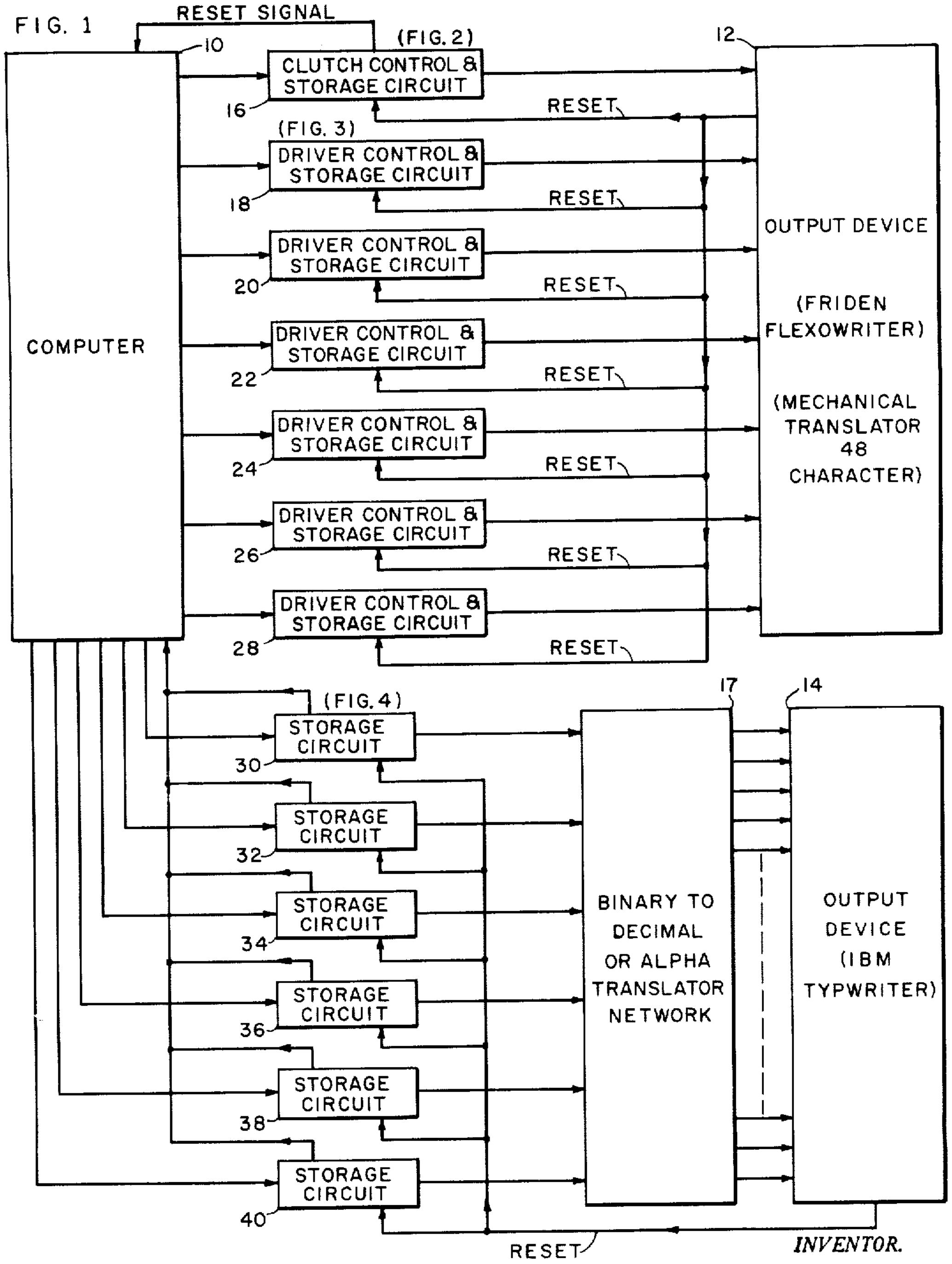
FIGURE 1 is a block diagram representing schematically the organization of a computer and associated output devices, and certain storage and control circuits so as to achieve the purposes of the present invention.

In the diagram of FIGURE 1, a usual electronic binary digital computer is represented by the block 10. It is to be understood, of course, that this computer may be of any known type, and which is capable of selectively introducing its multi-digit binary output information selectively to one or more output devices. In the embodiment of FIGURE 1, it is assumed that the binary output information from the computer is in the form of 6-bit binary words. As will be described, these multi-bit binary words are translated, either in the output device itself or in an intermediate network, into signals corresponding to different decimal or alpha characters. These latter signals operate appropriate driver elements in the output devices, so that the characters may be typed or printed on an appropriate medium.

In the organization of the system of FIGURE 1, two output devices are illustrated. One of these is designated by the block 12, and it is assumed to be the usual Friden Flexowriter. This particular device includes an internal mechanical translator, and it is capable of responding to the 6-bit binary information to translate the same into decimal and other characters, and to provide a record of the output.

A second output device, designated by the rectangle 14 is assumed to be an International Business Machines type typewriter. This latter device does not include an internal translator, so that a binary-to-decimal translator network 17 is provided. The translator network 17 responds to the 6-bit multi-digit binary input signals to provide output signals in accordance with a decimal or alpha, or other code, so that the various elements in the output device 14 may be actuated to provide the desired printed record.

It is to be understood, of course, that the particular output devices 12 and 14 are shown as merely typical of output devices in widespread present-day use in conjunction with digital computers. It will be evident as the description proceeds, that the system of the invention is not limited to any particular type of output device.

In the practice of the invention, a clutch control and storage circuit 16 is interposed between the computer 10 and the output device 12. The clutch control and storage circuit is shown in circuit detail in FIGURE 2, and this circuit will be described in more detail hereinafter.

The circuit 16 responds to an appropriate logic control signal from the computer 10 to be actuated from a first stable state to a second stable state. This means that the actual logic control signal from the computer may be in the form of a trigger signal, and there is no need for the computer itself to hold the circuit 16 in its second state and thus be rendered inactive for the particular holding interval.

The circuit 16 is utilized to activate a magnetic clutch in the output device 12. As noted above, the activation of this magnetic clutch enables a multi-bit binary word, also applied to the device, to be translated and printed in a corresponding operating cycle of the device initiated by the activation of the clutch. The magnetic clutch in the device 12 is actuated to permit the device 12 to operate through the corresponding operational cycle, so long as the circuit 16 is in its second stable state. At the completion of the operational cycle, the output device produces a reset signal which is introduced to the circuit 16 to reset it back to its original state. The circuit 16 sends a reset signal back to the computer 10 which indicates that it has been reset and is ready for the next character.

A plurality of driver control and storage circuits 18, 20, 22, 24, 26 and 28 are also interposed between the computer 10 and the output device 12. These latter driver circuits are six in number in the illustrated embodiment, and they correspond to each bit of the 6-bit binary output from the computer. The circuits are coupled to corresponding magnetic controls in the device 12, and they are triggered from a first stable state to a second stable state in correspondence with each unity bit in any particular piece of output information. These circuits are so triggered, together with the triggering of the clutch activating circuit 16, so as to introduce the corresponding multi-bit binary word to the output device in the form of voltage levels, and to initiate its operational cycle.

As was the case with the clutch activating circuit 16, the driver circuits are bi-stable in nature, so that the input signals may be in the form of trigger signals. That is, there is no need for the computer to hold the driver circuits 18, 20, 22, 24, 26, 28 in their second state. The result is that the multi-bit binary word instantaneously applied to the output circuits are converted thereby to voltage levels which continue until the completion of the aforesaid operational cycle of the device 12, during which time the computer 10 is free to proceed with its program. At the completion of the operational cycle, the device 12 introduces the aforesaid reset signal to the circuits 18, 20, 22, 24, 26 and 28 to return all the circuits to their first stable state. The clutch control and storage circuit, as noted above, then returns a signal to the computer 10 to indicate that it has been reset and is ready for the next character.

Figure 3:
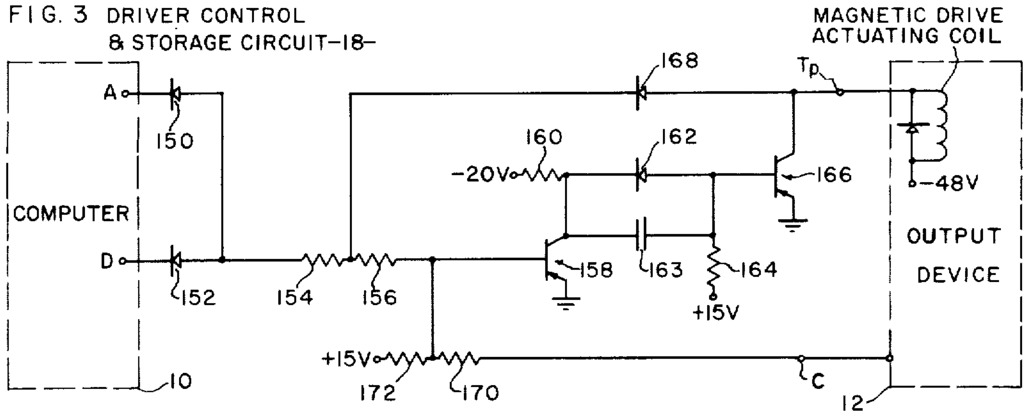
FIGURE 3 is a circuit diagram suitable for use in a second type of driver control and storage circuit in the block diagram of FIGURE 1.

The circuit details of the driver control and storage circuit 18 are shown in FIGURE 3, and the other circuits 20, 22, 24, 26 and 28 may be similarly constructed.

In like manner, a plurality of output circuits 30, 32, 34, 36, 38 and 40 are interposed between the computer 10 and the translator network 17. These latter output circuits are also bi-stable in nature, and they correspond to the different bits of the 6-bit output information from the computer, when the output device 14 is selected by the computer, rather than the output device 12.

The storage circuits 30, 32, 34, 36, 38 and 40 respond to the output trigger signals to be set to their second stable state in correspondence with any unity digits in the multi-bit output binary information. The resulting configuration of the storage circuits 30, 32, 34, 36, 38 and 40 causes the binary-to-decimal translator network 17 to produce appropriate decimal coded control signals for the output device 14, as explained above. At the completion of each operational cycle, the output device 14 applies a reset signal to the storage circuits 30, 32, 34, 36, 38 and 40 to return all these circuits to their first stable state. These circuits then return a signal to the computer 10 to indicate that they have been reset to their first stable state, and that they are ready for the next character.

In the description to follow of the circuit details of the different storage and driver circuits, it will become evident that these circuits represent very little more than the usual circuitry and components required to feed the output information from the computer to the associated output device without exhibiting the memory or storage feature. The storage and voltage conversion feature is built into each of these circuits by the inclusion of a relatively few extra components and extremely simple associated circuitry.

Figure 4:
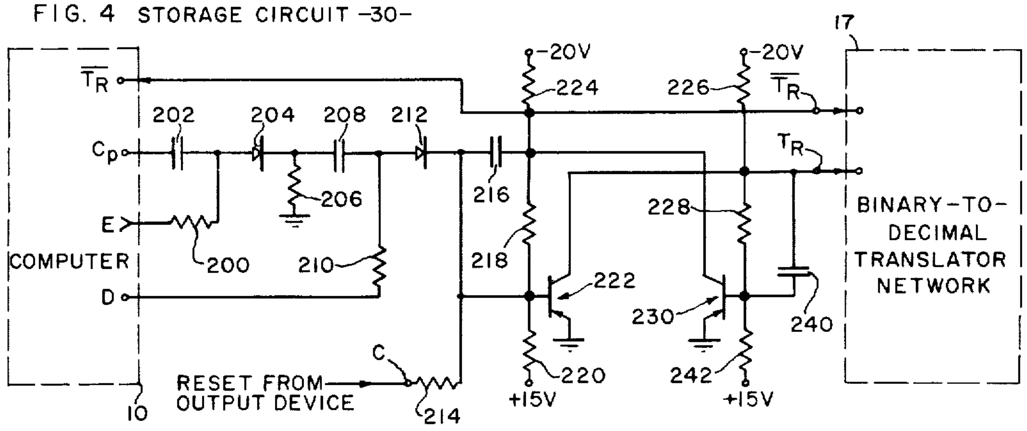
FIGURE 4 is a circuit diagram suitable for use in yet another storage circuit illustrated in FIGURE 1.

The storage circuit 30 is shown in circuit detail in FIGURE 4. It is to be understood, of course, that the storage circuits 32, 34, 36, 38 and 40 may also incorporate the same circuitry.

Figure 2:
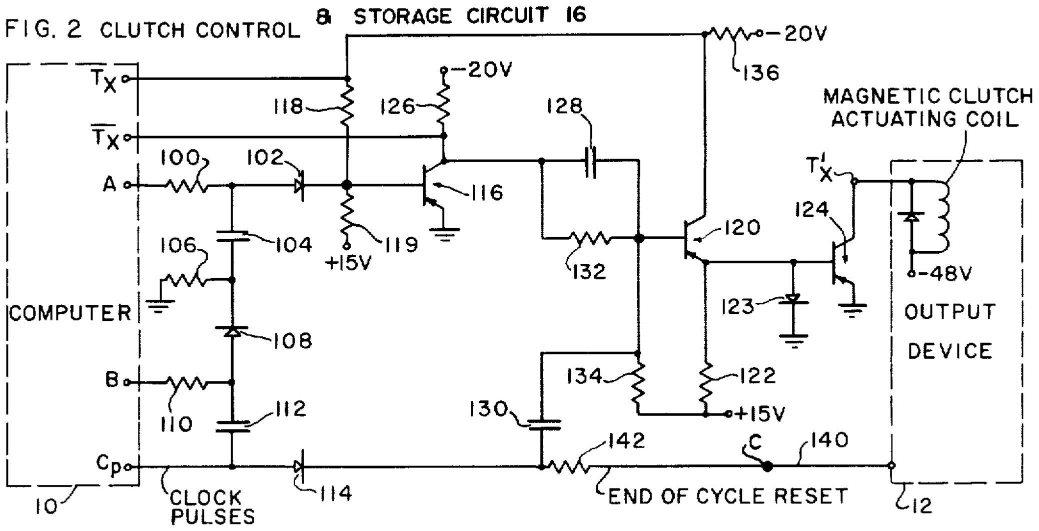
FIGURE 2 is a circuit diagram appropriate for use in one of the storage and control circuits illustrated in FIGURE 1.

The clutch control and storage circuit 16, as shown in FIGURE 2, includes three input terminals designated A, B and $C_p$ respectively.

The input terminal A is connected to a resistor 100 which may, for example, have a resistance of 1 kilo-ohm. The resistor 100 is connected to the anode of a diode 102 and to a capacitor 104. The capacitor 104 may have a capacity, for example, of 680 micro-microfarads, and it is connected to a grounded resistor 106 and to the cathode of a diode 108. The resistor 106 may, likewise, have a resistance of 1 kilo-ohm.

The input terminal B is connected to a resistor 110. The resistor 110 may have a resistance of 2.4 kilo-ohms, for example, and it is connected to the junction of the anode of the diode 108 and a capacitor 112. The capacitor 112 may have a capacity, for example, of 680 micro-microfarads, and it is connected to the anode of a diode 114. The input terminal $C_p$ is connected to the junction of the capacitor 112 and the diode 114, and it introduces clock pulses to the circuit.

The cathode of the diode 102 is connected to the base of a transistor 116 and to the junction of a pair of resistors 118 and 119. The resistor 119 may have a resistance, for example, of 56 kilo-ohms, and it is connected to the positive terminal of a 15-volt direct voltage source. The resistor 118, on the other hand, may have a resistance of 15 kilo-ohms, for example, and it is connected to the collector electrode of a transistor 120.

The transistors 116 and 120 are both of the PNP type. The emitter of the transistor 116 is grounded, and the emitter of the transistor 120 is connected to a resistor 122, to the anode of a diode 123, and to the base of an output transistor 124. The resistor 122 may have a resistance of 2.4 kilo-ohms, and it is connected to the positive terminal of the 15 volt direct voltage exciting source. The cathode of the diode 123 is grounded.

The collector of the transistor 116 is connected to an output terminal designated $\overline{T_X}$ and to a resistor 126. The resistor 126 may, for example, have a resistance of 800 ohms, and it is connected to the negative terminal of a 20 volt direct voltage source.

The collector of the transistor 116 is also connected to a coupling capacitor 128. The coupling capacitor 128 may, for example, have a capacity of 680 micromicrofarads, and it is shunted by a resistor 132. The resistor 132 may have a resistance, for example, of 2.4 kilo-ohms. The capacitor 128, the capacitor 130, and resistor 132 are connected to the base of the transistor 120 and to a resistor 134. The capacitor 130 may have a capacitance of 680 micro-microfarads. The resistor 134 may have a resistance, for example, of 33 kilo-ohms, and it is connected to the positive terminal of the 15 volt direct voltage source.

The collector of the transistor 120 is connected to an output terminal $T_X$. Both the output terminals $T_X$ and $\overline{T_X}$ are connected back to the computer 10 to provide information to the computer as to the state of the circuit 16. The collector of the transistor 120 is also connected to a resistor 136. The resistor 136 may have a resistance, for example, of 300 ohms, and it is connected to the negative terminal of the 20 volt direct voltage source.

The output transistor 124 is also a PNP transistor, and its emitter is grounded. The collector of the transistor 124 is connected to an output terminal designated $T'_X$. This output terminal is connected, for example, to the magnetic clutch actuating coil of the output device 12. The other terminal of the magnetic clutch actuating coil is connected, for example, to the negative terminal of a 48-volt direct voltage source. The output device 12 produces a reset signal on a lead 140 at the completion of its operating cycle. This lead is connected to an input terminal C which, in turn, connects with a resistor 142. The resistor 142 may, for example, have a resistance of 2.4 kilo-ohms, and it is connected to the capacitor 130 and to the cathode of the diode 114.

The clutch control and storage circuit of FIGURE 2 provides a control for an external solenoid operated device, such as the actuating coil for the magnetically controlled clutch of the output device 12. The computer applies clock pulses to the input terminal $C_p$, and it also applies logical inputs A and B to the corresponding input terminals of the circuit. As noted above, the output device 12 applies a reset signal C to the corresponding input terminal of the circuit. This reset signal C is set false at the end of each operating cycle of the output device 12 to provide the desired reset signal $\overline{C}$ to the circuit of FIGURE 2.

The circuit of FIGURE 2 has two stable states. When the circuit is in its second stable state, the output at the output terminal $T'_X$ is true to provide an energizing current for the solenoid actuating coil of the clutch in the output device 12. However, when the circuit is reset to its first stable state, the output current through the solenoid coil is virtually cut off.

The bi-stable circuit of FIGURE 2 is set to its second stable state by the first clock pulse to occur after the inputs A, B and C simultaneously represent logical "1." However, once the circuit is set to its second stable state, the inputs A and B lose control and may be removed. The circuit is returned to its first stable state by the first clock pulse $C_p$ to occur after the input C becomes logical "0."

Therefore, it requires but an instantaneous control from the computer, namely the setting of the inputs A and B to logical "1," followed by a clock pulse, to cause the circuit of FIGURE 2 to assume its second stable state during which the clutch in the device 12 is actuated to cause the device to undergo an operational cycle.

After the circuit of FIGURE 2 has been set to its second stable state, the computer may proceed with its program, without any period of waiting, while the output device is undergoing its operational cycle. When the operational cycle of the output device is completed, the reset signal C becomes logical "0," to enable the next clock pulse $C_p$ to reset the circuit of FIGURE 2 to its first stable state. The signal C then becomes true to indicate that the output device 12 is ready to accept the next multi-bit binary word of output information. The next binary word is fed to the output device 12 by the triggering of the driver circuits 18, 20, 22, 24, 26 and 28, and the corresponding operational cycle of the device 12 is then initiated when the computer sets both the inputs A and B to logical "1" so as to set the circuit 16 to its second stable state at the occurrence of the next clock pulse.

As mentioned above, the collector of the output transistor 124 is connected to the output terminal $T'_X$. When the transistor 124 is in saturation, the bi-stable circuit of FIGURE 2 is in its second stable state, so that maximum current flows through the solenoid coil of the magnetically controlled clutch in the output device 12. The low emitter-to-collector impedance of the saturated transistor 124 permits the energizing current to flow through the solenoid coil to the negative terminal of the 48 volt supply.

When the bi-stable circuit of FIGURE 2 is reset to its first stable state, the transistor 124 becomes non-conductive. The resulting relatively high emitter-to-collector impedance of the non-conductive transistor 124 reduces the output current essentially to zero, so that the current flow through the solenoid coil of the clutch in the device 12 is insufficient to actuate the clutch.

The transistor 120 in the circuit of FIGURE 2 controls the conductivity of the output transistor 124. When the transistor 120 is fully conductive, its low emitter-to-collector impedance permits the 20 volt supply to draw sufficient current from the base of the transistor 124 to drive the latter transistor to its fully conductive saturated condition. When the transistor 120 is rendered non-conductive, on the other hand, current from the +15 volt supply is shunted through the diode 123, thus keeping the base of the transistor 124 slightly positive, and causing the transistor 124 to become non-conductive. The diode 123 also serves to reduce the power dissipation of the transistor 120 when it is non-conductive, as the resulting current from the 15 volt supply, which would otherwise flow through the transistor 120, flows through the diode 123.

As noted above, the transistors 116 and 120 form a bi-stable circuit. When the transistor 116 is fully conductive, the potential of its collector approaches ground potential. The voltage between the collector of the transistor 116 and the 15 volt supply is divided by the resistors 132 and 134 to provide a slightly positive bias on the base of the transistor 120 when the transistor 116 is fully conductive, thereby rendering the transistor 120 non-conductive.

A voltage divider, consisting of the resistors 118 and 119, connected between the collector of the transistor 120 and the 15 volt supply, provides a negative bias for the base of the transistor 116 when the transistors 120 is non-conductive, so as to maintain the transistor 116 in its fully conductive saturated condition.

When the transistor 116 is triggered to its non-conductive condition, the potential of its collector swings negative, and this draws base current from the transistor 120 through the resistor 132. This causes the transistor 120 to become fully conductive, so that its collector potential is reduced to ground. The voltage divider formed by the resistors 118 and 120 now supplies a positive bias to the base of the transistor 116, to maintain the latter transistor non-conductive.

The logic inputs A and B are applied to the base of the transistor 116 through two uni-directional diode gates operating in series. The first gate includes the capacitor 112 and resistor 110 and the diode 108, the diode being loaded by the resistor 106. The input B is applied to this first gate and through the resistor 110.

The second gate includes the resistor 100, the capacitor 104, and the diode 102. The second gate is loaded by the base circuit of the transistor 116. The input A is applied to the second gate through the resistor 100, and the output of the first gate is applied to the second gate through the capacitor 104.

The positive-going clock pulses $C_p$ pass through the first gate only when the input to the terminal B is a logical "1," and through the second gate only when the input to the terminal A is a logical "1." Therefore, both inputs A and B must be a logical "1" before a positive pulse appears at the base of the transistor 116 to render the transistor non-conductive, and thereby setting the bi-stable circuit of FIGURE 2 to its second stable state.

A third gate including the resistor 142, the diode 114 and the capacitor 130 connects the input terminal C to the base of the transistor 120. Clock pulses are applied to the third gate through the diode 114, and the input to the terminal C is applied through the resistor 142.

The above-mentioned third gate passes clock pulses $C_p$ to the base of the transistor 120 only when the input to the terminal C is a logical "0." When the input to the terminal C is a logical "1," the diode 114 is cut off, so that the clock pulses cannot pass through it. When the input to the terminal C is a logical "0," on the other hand, the diode 114 is biased to permit the clock pulses $C_p$ to pass through it and through the capacitor 130 to the base of the transistor 120. The application of a clock pulse to the base of the conductive transistor 120 causes the transistor to become non-conductive, thereby resetting the circuit of FIGURE 2 to its first state.

It will be appreciated that the resistance-capacity time-constant networks included in the above-described gates are such that the gates are not susceptible to false operation by spurious signals. In each instance the input signals must be established at logical "1" for a time sufficient to charge the associated capacitor. Only when each capacitor achieves its charged condition is the particular gate conditioned to pass the next clock pulse.

The driver control and storage circuit 18 is shown in FIGURE 3. This circuit also has three input terminals designated respectively A, D and C. The input terminals A and D receive appropriate control and information signals from the computer. The input terminal C receives the reset signal from the output device 12.

The input terminal A is connected to the cathode of a diode 150, and the input terminal D is connected to the cathode of a diode 152. The anodes of the diodes 150 and 152 are connected to a resistor 154 which, in turn, is connected to a resistor 156. The resistors 154 and 156 each have a resistance of, for example, 6.8 kilo-ohms. The resistor 156 is connected to the base of a transistor 158. The emitter of the transistor 158 is grounded, and the collector is connected to a resistor 160. The resistor 160 may, for example, have a resistance of 800 ohms, and it is connected to the negative terminal of a 20 volt direct voltage source.

The collector of the transistor 158 is connected to the cathode of a diode 162. The anode of the diode 162 is connected to a resistor 164 and to the base of a transistor 166. The resistor 164 may, for example, have a resistance of 2.4 kilo-ohms, and it is connected to the positive terminal of a 15 volt direct voltage source. The transistors 158 and 166 both have grounded emitters, and each is of the PNP type. The collector of the transistor 166 is connected to an output terminal designated $T_p$ and to the anode of a diode 168. The cathode of the diode 168 is connected back to the junction of the resistors 154 and 156.

The input terminal C is connected to a resistor 170 which may, for example, have a resistance of 10 kilo-ohms. The resistor 170 is connected to a resistor 172 and to the base of the transistor 158. The resistor 172 may, for example, have a resistance of 56 kilo-ohms, and it is connected to the positive terminal of the 15 volt direct voltage source. The output terminal $T_p$ is connected to the solenoid coil of the associated driver member in the output device 12.

As explained above, the circuit of FIGURE 3 is a bi-stable circuit. The output logic control signal A from the computer conditions the circuit for actuation when it is logical "1"; and then if the corresponding bit of the digital binary output information is a "1," the information term D is also "1," so that the circuit is triggered from its first stable state to its second stable state. Conversely, when the corresponding bit is a zero, the information term "D" is also logical "0" and the circuit remains in its first stable state.

When the circuit of FIGURE 3 is triggered to its second stable state, the transistor 166 is fully conductive to draw a current through the associated solenoid coil by way of the output terminal $T_p$. The current through the solenoid coil causes the corresponding driver member in the output device 12 to be actuated in conformance to a "1" represented by the corresponding binary bit.

In the same manner, the other circuits 20, 22, 24, 26 and 28 of FIGURE 1 are triggered to their first or second stable states, depending upon whether their individual information input D is a "1" or a "0." The driver members in the output device 12 which are actuated by the circuits are correspondingly set to their "1" or "0" positions. At the same time, the computer sets the input "B" of the circuit 16 to "1" to activate the clutch and initiate an operational cycle in the device 12.

At the end of the operational cycle of the output device 12, the output device causes the reset signal applied to the terminal C to become false to reset the circuits 16, 18, 20, 22, 24, 26 and 28 each to its first stable state. The reset term C then becomes true, so as to condition the circuits for actuation for the next operational cycle.

The driver control and storage circuits 18, 20, 22, 24, 26 and 28 provide a logical control of the solenoid operated drivers in the output device 12. As noted, the circuit 18, for example, provides an output $T_p$, and it responds to three logical inputs A, D and C. The solenoid coil operated by the circuit 18 is connected to the negative terminal of a 48 volt source, as shown.

The driver control and storage circuits, such as the circuit 18 of FIGURE 3, has two stable states. When the circuit 18 is set to its second stable state, current flows from the output terminal $T_p$ through the associated solenoid coil in the device 12 to the negative terminal of the 48 volt source. When the circuit 18 is reset to its first stable state, on the other hand, the output current through the solenoid coil is virtually cut off.

The circuit 18 is set to its second stable state when the three inputs A, D and C simultaneously represent logical "1." As in the circuit of FIGURE 2, once the circuit 18 of FIGURE 3 has been set to its second stable state, the inputs A and D lose control, and the circuit can be reset only when the input C becomes logical "0." In this manner, the computer is able to feed digital information into the circuits 18, 20, 22, 24, 26 and 28, and then proceed with its program, since the information is stored and retained in the circuits until the operating cycle of the output device 12 is completed.

The collector of the transistor 166 is the output terminal of the driver control and storage circuit 18 of FIGURE 3. When the circuit is set to its second stable state, the transistor 166 is established in its fully conductive saturated condition. The resulting low emitter-to-collector impedance of the fully conductive transistor 166 permits current to flow from ground through the corresponding solenoid coil in the device 12 to the negative terminal of the 48 volt source. This current is sufficient to energize the associated solenoid to actuate the corresponding driver member in the output device from its "0" to its "1" position.

When the bi-stable circuit 18 of FIGURE 3 is reset to its first stable state, on the other hand, the transistor 166 is rendered non-conductive. The resulting emitter-to-collector impedance of the transistor 166 in its non-conductive state is high enough to reduce the output current through the associated actuating coil below the amount necessary to actuate the associated solenoid.

The transistor 158 controls the conductivity of the transistor 166. When the transistor 158 is fully conductive, the potential at its collector electrode is reduced approximately to ground voltage. A voltage divider comprising the resistor 164 and diode 162 is formed between the collector of the transistor 158 and the positive terminal of the 15 volt supply. This voltage divider provides a positive bias for the transistor 166 when the transistor 158 is conductive, so as to render the transistor 166 non-conductive and maintain the circuit in its first stable state. The diode 162 may be replaced by a low value resistor, if so desired. The diode 162 may be shunted by a capacitor 163 of a value, for example, of 1 microfarad, to speed up the switching time.

When the transistor 158, on the other hand, is rendered non-conductive, the voltage divider formed by the diode 162 and resistor 164 provides a negative bias to the base of the transistor 166, thereby driving the transistor 166 to its fully conductive saturated state. In this latter state of conductivity of the transistors 158 and 166, the circuit 18 of FIGURE 3 is set to its second stable state.

Assuming that the circuit 18 of FIGURE 3 is initially in its first stable state, in which the transistor 158 is fully conductive and the transistor 166 is non-conductive, the transistor 158 must be rendered non-conductive to set the circuit to its second stable state. In order that the transistor 158 may be rendered non-conductive, it is necessary that all three inputs A, D and C represent logical "1" simultaneously. If any of these three inputs represents logical "0," sufficient base current is drawn from the transistor 158 to maintain it in its conductive saturated state.

For example, if the input A is logical "0," it has a negative value, so that the diode 150 is biased in its forward sense. The resulting base current flows through the transistor 158 from ground to the input A, so that the transistor is held in its fully conductive state. The resistors 154 and 156 serve as limiting resistors for the base current.

When all three inputs A, D and C represent logical "1," the voltage division between the 15 volt source and the input holds the base of the transistor 158 slightly positive, thereby rendering the transistor non-conductive. When this occurs, the voltage at the collector of the transistor 158 drops to a negative value so that the transistor 166 becomes fully conductive, and the circuit is set to its second state.

Once the bi-stable circuit 18 of FIGURE 3 has been set to its second state, the voltage at the collector of the transistor 166 approaches ground potential, and the diode 168 clamps the junction between the resistors 154 and 156 to this voltage. This causes both the inputs A and D to lose control of the circuit, and the circuit is held in its second stable state until the input C becomes logical "0." At that time, the transistor 154 is driven to its conductive state, to reset the circuit to its first stable state.

The storage circuit 30, as noted above, is shown in circuit detail in FIGURE 4. As also mentioned, the other storage circuits 32, 34, 36, 38 and 40 may incorporate similar circuitry. The latter circuits respond to inputs E, D and clock pulses $C_p$ from the computer, and to an input term C from the output device 14 of FIGURE 1. The term E is the output select control signal, and the term D is the information signal as in the circuit of FIGURE 3.

In FIGURE 4, the input terminal E is connected to a resistor 200 which may, for example, have a resistance of 2.4 kilo-ohms, and the input terminal $C_p$ is connected to a capacitor 202 which may, for example, have a capacity of 680 micro-microfarads. The resistor 200 and capacitor 202 are connected to the anode of a diode 204, the cathode of which is connected to a grounded resistor 206 and to a capacitor 208. The resistor 206 may, for example, have a resistance of 1 kilo-ohm, and the capacitor 208 may have a capacity of 680 micro-microfarads. The input terminal D is connected to a resistor 210 which may, for example, have a resistance of 1 kilo-ohm. The resistor 210 and the capacitor 208 are connected to the anode of a diode 212.

The input terminal C is connected to a resistor 214 which, in turn, is connected to the junction of the diode 212 and a capacitor 216, and which is also connected to the junction of a pair of resistors 218 and 220, and to the base of a PNP transistor 222. The resistor 214 may, for example, have a resistance of 15 kilo-ohms, the capacitor 216 a capacity of 120 micro-microfarads, the resistor 218 a resistance of 15 kilo-ohms, and the resistor 220 a resistance of 82 kilo-ohms.

The resistor 220 is connected to the positive terminal of the 15 volt direct voltage source, and the resistor 218 is connected to a further resistor 224. The resistor 224 may have a resistance, for example, of 800 ohms, and it is connected to the negative terminal of the 20 volt direct voltage source.

The emitter of the transistor 222 is grounded, and its collector is connected to the junction of a pair of resistors 226 and 228. The resistor 226 may, for example, have a resistance of 800 ohms, and it is connected to the negative terminal of a 20 volt direct voltage source. The resistor 228, on the other hand, may have a resistance of 15 kilo-ohms, and it is connected to the base of a PNP transistor 230. The transistors 222 and 230 each have grounded emitters. The collector of the transistor 230 is connected back to the junction of the resistors 218 and 224.

The resistor 228 is shunted by a capacitor 240 which may, for example, have a capacitance of 120 micro-microfarads. The resistor 228 and a capacitor 240 are connected to the base of the transistor 230 and to a resistor 242. The resistor 242 may, for example, have a resistance of 82 kilo-ohms, and it is connected to the positive terminal of the 15 volt direct voltage source.

The collector of the transistor 222 is also connected to an output terminal $T_R$ which, in turn, is connected to the corresponding input terminal of the binary-to-decimal translator network 17 of FIGURE 1. The collector of the transistor 230 is connected to an output terminal $\overline{T_R}$ which, in turn, is also connected to the corresponding input terminal of the translator network 17. The output terminals $T_R$ and $\overline{T_R}$ supply outputs to the translator network 17. Also, the terminal $\overline{T_R}$ is connected back to the computer 10 to provide an indication to the computer when the storage circuit has been reset.

As mentioned above, the storage circuit 30 of FIGURE 4, and the other storage circuits 32, 34, 36, 38 and 40 of FIGURE 1 serve to store the binary bits of the digital binary output information, so as to permit each multi-bit output word to be utilized at a relatively slow rate by the associated output device, while the computer proceeds with the program.

The storage circuit of FIGURE 4 is actually a flip-flop which provides temporary storage, as mentioned above. The flip-flop has a clock pulse input, designated by the input terminal $C_p$, and it has three logical inputs designated E, D and C. The circuit also has two logical outputs at the output terminals respectively designated $T_R$ and $\overline{T_R}$. The two stable states of the flip-flop circuit of FIGURE 4 are designated as set and reset. During the set state, the output term $T_R$ is logical "1" and during the reset state, this output term is logical "0."

The flip-flop storage circuit 30 of FIGURE 4 in its reset state, is set by the first clock pulse $C_p$ to occur after the inputs D, E and C are simultaneously logical "1." Once the flip-flop storage circuit is set, and as in the circuits of FIGURES 2 and 3, the inputs D and E lose control, and the circuit may be reset only when the input C from the output device 14 becomes a logical "0." The reset operation is not clock pulse synchronized.

When the flip-flop storage circuit 30 of FIGURE 4 is reset to its first stable state, the transistor 222 is in its fully conductive saturated state, and the transistor 230 is non-conductive. Because of its low emitter-to-collector impedance, the collector electrode of the conductive transistor 222 is near ground potential. A voltage divider, consisting of the resistor 228 and the resistor 242 connected between the collector of the transistor 222 and the positive terminal of the 15 volt direct voltage source provides a positive bias for the base of the transistor 230 to maintain that transistor non-conductive when the circuit is in its first stable state.

Because the emitter-to-collector impedance of the non-conductive transistor 230 is relatively high, the collector of the transistor 230 is at a negative voltage. A voltage divider, formed by the resistors 218 and 220 between the collector of the transistor 230 and the positive terminal of the 15 volt direct voltage source supplies a sufficiently negative bias to the base of the transistor 222 to hold it in a fully conductive condition, so long as the transistor 230 is non-conductive.

When the flip-flop storage circuit 30 of FIGURE 4 is set to its second stable state, the transistor 222 is rendered non-conductive, and the transistor 230 is driven to its fully conductive saturated state. During this latter condition, the collector of the transistor 222 approaches ground potential, so that the term $T_R$ represents logical "1."

Assuming that the flip-flop storage circuit 30 of FIGURE 4 is initially reset to its first stable state, so that the transistor 222 is fully conductive, and the transistor 230 is non-conductive, the circuit may be set to its second stable state by applying a positive pulse to the base electrode of the transistor 222.

The above-mentioned positive pulse is applied by the positive-going clock pulse $C_p$ succeeding the setting of the three logical inputs D, E and C to their logical "1" state. If any of the inputs D, E and C are in their logical "0" state, the circuit of FIGURE 4 cannot be set to its second stable state.

The inputs D, E and $C_p$ are applied to the base of the transistor 222 through two unidirectional diode gates, operating in series. These gates are similar to the time-constant resistance-capacity gates in the circuit of FIGURE 2. The first gate in the circuit of FIGURE 4 consists of the resistor 200, the capacitor 202, and the diode 204. This first gate is loaded by the grounded resistor 206. The input E is applied to the first gate through the resistor 200, and the clock pulses are applied through the capacitor 202.

The second gate of the circuit of FIGURE 4 consists of the resistor 210, the capacitor 208, and the diode 212. The second gate is loaded by the base circuit of the transistor 222. The input D is applied to the second gate through the resistor 210, and the output of the first gate is applied to the second gate through the capacitor 208.

Positive-going clock pulses applied to the input terminal $C_p$ can pass through the above-mentioned two gates to the base of the transistor 222, only when both inputs D and E are logical "1." If either input D or E is logical "0," the diode associated with the corresponding input gate is back-biased, thereby preventing the passage of the clock pulses $C_p$. When a clock pulse reaches the base of the transistor 222 it drives the transistor to its non-conductive state to set the flip-flop storage circuit 30 to its second stable state. Once the circuit 30 is set to its second stable state, a change in the state of either input D or E, or both, cannot affect the state of the circuit.

The reset signal C from the output device 14 is applied to the base of the transistor 222 directly and not through a diode gate. When the reset signal C becomes logical "0," it draws base current from the transistor 222 to drive that transistor to its conductive state, and thereby reset the circuit.

The invention provides, therefore, an improved output control and storage circuit and system for use in conjunction with a digital computer, and for enabling the computer conveniently to feed output information to associated output devices. The improved output circuit of the present invention is advantageous in that it requires but a few simple added components to provide signal-storing capabilities to the circuitry normally required to transfer the output information to the associated output devices.

It will be appreciated that the transistor circuits shown in FIGURES 2, 3 and 4 represent but slight modifications of the normal transistorized transfer and amplifier circuits used to couple the computer to the usual output devices. However, these slight modifications impart to the transistor circuits the capabilities of storing the information, and for causing the information to be applied to the output devices at a relatively slow rate while the computer proceeds with its normal operational steps.

While particular embodiments of the invention have been shown and described, modifications may be made, and it is intended in the claims to cover the modifications that fall within the spirit and scope of the invention.

What is claimed is:

1. In combination for use with a digital computer, said digital computer generating trains of pulses representing multi-digit binary output information: an output device for utilizing said output information in successive operational cycles and producing a reset signal at the end of each such cycle; a plurality of bi-stable circuits interposed between the computer and said output device in correspondence with each digit of said multi-digit output; a corresponding plurality of gate circuits interposed between the computer and respective ones of the bi-stable circuits and responsive to said pulses from the computer for setting selected ones of the bi-stable circuits so as to provide voltage levels to actuate the output device; first circuitry coupling said output device to said bi-stable circuits to reset said bi-stable circuits in response to said reset signal; and further circuitry coupling said output device to said gate circuits and responsive to said reset signal to disable said gate circuits during any operational cycle of said output device.

2. The combination defined in claim 1, and which includes circuitry coupled to at least one of said bi-stable circuits to provide an indication to said computer when an operational cycle of said output device has been completed.

3. The combination defined in claim 1, and which includes a binary-decimal translating network interposed between said bi-stable circuits and said output device.

4. The combination defined in claim 1, in which said output device includes an electro-magnetic drive means having an actuating coil, and in which one of said bi-stable circuits is coupled to said actuating coil to energize said drive means when such bi-stable circuit is set.

References Cited by the Examiner

UNITED STATES PATENTS

| | | | |
|---|---|---|---|
| 2,988,735 | 6/1961 | Everett et al. ------ | 340—172.5 |
| 3,094,610 | 6/1963 | Humphrey et al. ---- | 340—172.5 |

OTHER REFERENCES

Computer Basics, volume 6, Solid-State Computer Circuits, by Technical Education and Management Inc., published April 1962. Page 132.

ROBERT C. BAILEY, *Primary Examiner.*

MALCOLM A. MORRISON, *Examiner.*

P. L. BERGER, *Assistant Examiner.*